(12) United States Patent
Camenisch et al.

(10) Patent No.: US 9,781,078 B2
(45) Date of Patent: *Oct. 3, 2017

(54) MANAGING UNLINKABLE IDENTIFIERS FOR CONTROLLED PRIVACY-FRIENDLY DATA EXCHANGE

(71) Applicant: INTERNATIONAL BUSINESS MACHINES CORPORATION, Armonk, NY (US)

(72) Inventors: Jan L. Camenisch, Rueschlikon (CH); Anja Lehmann, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,922

(22) Filed: Dec. 6, 2016

(65) Prior Publication Data
US 2017/0104726 A1 Apr. 13, 2017

Related U.S. Application Data

(63) Continuation of application No. 14/707,193, filed on May 8, 2015, now Pat. No. 9,548,970.

(30) Foreign Application Priority Data

May 13, 2014 (GB) .................................. 1406895.1

(51) Int. Cl.
*H04L 29/06* (2006.01)
*H04L 9/08* (2006.01)
(Continued)

(52) U.S. Cl.
CPC ...... *H04L 63/0421* (2013.01); *G06F 21/6254* (2013.01); *H04L 9/0869* (2013.01); *H04L 63/0428* (2013.01); *G06F 17/30958* (2013.01)

(58) Field of Classification Search
CPC ............. H04L 63/0421; H04L 63/0428; H04L 9/0869; G06F 21/6254; G06F 17/30958
See application file for complete search history.

(56) References Cited

U.S. PATENT DOCUMENTS 8,108,678 B1 * 1/2012 Boyen ................. H04L 9/0847
380/30
8,468,355 B2 * 6/2013 Gerdes, Jr. ............ H04L 9/3213
713/170
(Continued)

OTHER PUBLICATIONS

Berthold, Oliver, et al. "Identity management based on P3P.", Retrieved from https://link.springer.com/chapter/10.1007/3-540-44702-4_9#page-1 , Designing privacy enhancing technologies. Springer Berlin Heidelberg, 2001.*

(Continued)

*Primary Examiner* — Chau Le
*Assistant Examiner* — Muhammad Chaudhry
(74) *Attorney, Agent, or Firm* — Cantor Colburn LLP

(57) ABSTRACT

A method for managing unlinkable database user identifiers includes distributing to a first database a first encrypted user identifier, a first database identifier, and a first database user identifier; distributing to a second database a second encrypted user identifier, a second database identifier, and a second database user identifier; receiving from the first database a third encryption and a fourth encryption, the third encryption being formed from the first encrypted user identifier, the second database identifier, and a message comprised in the fourth encryption; decrypting the third encryption thereby obtaining a decrypted value; deriving a blinded user identifier from the decrypted value; and sending the encrypted blinded user identifier and the fourth encrypted value to the second server thereby enabling the second server to compute the second database user identifier from (Continued)

the encrypted blinded database user identifier and the decrypted fourth encrypted value.

7 Claims, 7 Drawing Sheets

(51) Int. Cl.
*G06F 21/62* (2013.01)
*G06F 17/30* (2006.01)

(56) References Cited

U.S. PATENT DOCUMENTS

| | | | |
|---|---|---|---|
| 8,837,738 B2* | 9/2014 | Huang | H04L 9/0836 380/281 |
| 8,887,246 B2* | 11/2014 | Naslund | H04L 9/0841 726/4 |
| 2005/0283608 A1* | 12/2005 | Halcrow | G06Q 20/3674 713/175 |
| 2010/0325441 A1* | 12/2010 | Laurie | G06F 21/31 713/185 |
| 2012/0296829 A1* | 11/2012 | Camenisch | G06Q 20/38 705/67 |
| 2013/0097086 A1* | 4/2013 | Dala | G06F 19/322 705/51 |

OTHER PUBLICATIONS

Camenisch et al., "Managing Unlinkable Identifiers for Controlled Privacy-Friendly Data Exchange", U.S. Appl. No. 14/707,193, filed May 8, 2015.
List of IBM Patents or Patent Applictions Treated as Related; (Appendix P), Date Filed Dec. 6, 2016; 2 pages.

\* cited by examiner 100 method for managing unlinkable
database user identifier 102 distributing a first encrypted identifier,
a first database identifier, and
a first database user identifier 104 distributing a second encrypted identifier,
a second database identifier, and
a second database user identifier 106 receiving from the first database
a third and fourth encryption, a second
database identifier and a message
contained in the fourth encryption 108 decrypting the third encryption 110 deriving a blinded user identifier 112 sending the blinded user identifier and
the fourth encrypted value

FIG. 1

MANAGING UNLINKABLE IDENTIFIERS FOR CONTROLLED PRIVACY-FRIENDLY DATA EXCHANGE

DOMESTIC AND FOREIGN PRIORITY

This application is a Continuation of U.S. application Ser. No. 14/707,193; filed May 8, 2015 which claims priority to Great Britain Patent Application No. 1406895.1, filed May 13, 2014, and all the benefits accruing therefrom under 35 U.S.C. §119, the contents of which in its entirety are herein incorporated by reference.

BACKGROUND

The invention relates generally to a method for managing unlinkable identifiers for controlled privacy-friendly data exchange. The invention relates further to a related system for managing unlinkable identifiers for controlled privacy-friendly data exchange, a computing system, a data processing program, and a computer program product.

When large-scale personal data is collected in a distributed environment there are basically two main paradigms on how the data is maintained across the different domains. Either (i) each server knows the user under the local identifier and there exists a central authority that knows the mapping between them or, (ii) the user has a globally unique identifier that is used by all servers. Both approaches have different pros and cons in terms of data control and privacy, with privacy being one of the most challenged attributes in global data collection activities.

One main advantage of the first approach is the unlinkability of the individual data records held by the different servers. The individual identifiers are created by a trusted authority such that they cannot be linked by the servers alone but only through the central authority. Thus, as long as this central authority is trusted, there is no unique process that allows to easily link different pieces of the data together when they get stolen, leaked or are maintained by corrupted servers.

Another positive aspect is a strong controllability as every request to exchange or link user data has to be processed by the central authority who then translates the local identifiers from one domain to another. Thus, the trusted authority has full control and overview of the data exchange that is performed in the entire system.

However, the latter is also the main disadvantage of this first approach, as it introduces a powerful entity that learns how data requests, and in particular for which users of those requests are made. This can create a new and extensive pool of sensitive user data, which again needs to be protected accordingly. Thus, while the first approach provides good control over the data exchange, it is clearly not satisfactory in terms of privacy.

The second approach of providing every user with a globally used unique identifier is obviously a solution to the privacy problem imposed by the powerful central authority. Namely, due to the global identifier, linking and exchanging data becomes trivial among the individuals servers, i.e., there is no need of a central authority anymore that will run data requests. However, this approach comes for the price of losing the controllability of the performed data exchanges. Moreover, potentially data breaches of the servers become much more critical as the monetary value of the data increases. That is, having a globally unique identifier makes stealing the data more lucrative and the impact of data losses becomes more severe, which is a security and privacy threat as well.

A couple of ideas have been published to secure data privacy. US20130097086A1 discloses, for example, a system for securing patient medical information for communication over a potentially vulnerable system. It includes separating patients' medical files into a demographic layer and data layer, separately encrypting the demographic layer and data layer by using different encryption keys, and providing servers in a communication and processing system with a decryption key for the layer processed by such server. Medical file data may be separated into more than two layers. Users accessing the system are authenticated by using standard techniques. By separately encrypting different parts of a patient's medical record, the processing and communication of patient medical files by intermediary servers is enabled without risking disclosure of sensitive patient information if such servers are compromised.

However, there remains a need for a more secure cross-server data access to private data of individuals without the possibility to cross-identify personal data across the servers.

SUMMARY

In one embodiment, a method for managing unlinkable database user identifiers includes distributing to a first database a first encrypted user identifier, a first database identifier, and a first database user identifier; distributing to a second database a second encrypted user identifier, a second database identifier, and a second database user identifier; receiving from the first database a third encryption and a fourth encryption, the third encryption being formed from the first encrypted user identifier, the second database identifier, and a message comprised in the fourth encryption; decrypting the third encryption thereby obtaining a decrypted value; deriving a blinded user identifier from the decrypted value; and sending the encrypted blinded user identifier and the fourth encrypted value to the second server thereby enabling the second server to compute the second database user identifier from the encrypted blinded database user identifier and the decrypted fourth encrypted value.

In another embodiment, a system for managing unlinkable database user identifiers includes a processor implemented first distribution unit adapted to distribute to a first database a first encrypted user identifier, a first database identifier, and a first database user identifier; a processor implemented second distribution unit adapted to distribute to a second database a second encrypted user identifier, a second database identifier, and a second database user identifier; a processor implemented receiving unit adapted to receive from the first database a third encryption and a fourth encryption, the third encryption being formed from the first encrypted user identifier, the second database identifier, and a message comprised in the fourth encryption; a processor implemented decrypting unit adapted to decrypt the third encryption thereby obtaining a decrypted value; a processor implemented deriving unit adapted to derive a blinded user identifier from the decrypted value; and a processor implemented sending unit adapted to send the encrypted blinded user identifier and the fourth encrypted value to the second server thereby enabling the second server to compute the second database user identifier from the encrypted blinded database user identifier and the decrypted fourth encrypted value.

In another embodiment, a non-transitory, computer readable storage medium has instructions stored thereon that, when executed by a computer, implement a method for managing unlinkable database user identifiers. The method includes distributing to a first database a first encrypted user identifier, a first database identifier, and a first database user identifier; distributing to a second database a second encrypted user identifier, a second database identifier, and a second database user identifier; receiving from the first database a third encryption and a fourth encryption, the third encryption being formed from the first encrypted user identifier, the second database identifier, and a message comprised in the fourth encryption; decrypting the third encryption thereby obtaining a decrypted value; deriving a blinded user identifier from the decrypted value; and sending the encrypted blinded user identifier and the fourth encrypted value to the second server thereby enabling the second server to compute the second database user identifier from the encrypted blinded database user identifier and the decrypted fourth encrypted value.

BRIEF DESCRIPTION OF THE DRAWINGS

Embodiments of the invention will now be described, by way of example, and with reference to the following drawings:

FIG. 1 shows a flow diagram of a method for managing unlinkable identifiers for controlled privacy-friendly data exchange, in accordance with an exemplary embodiment of the invention;

DETAILED DESCRIPTION

Figure 2:
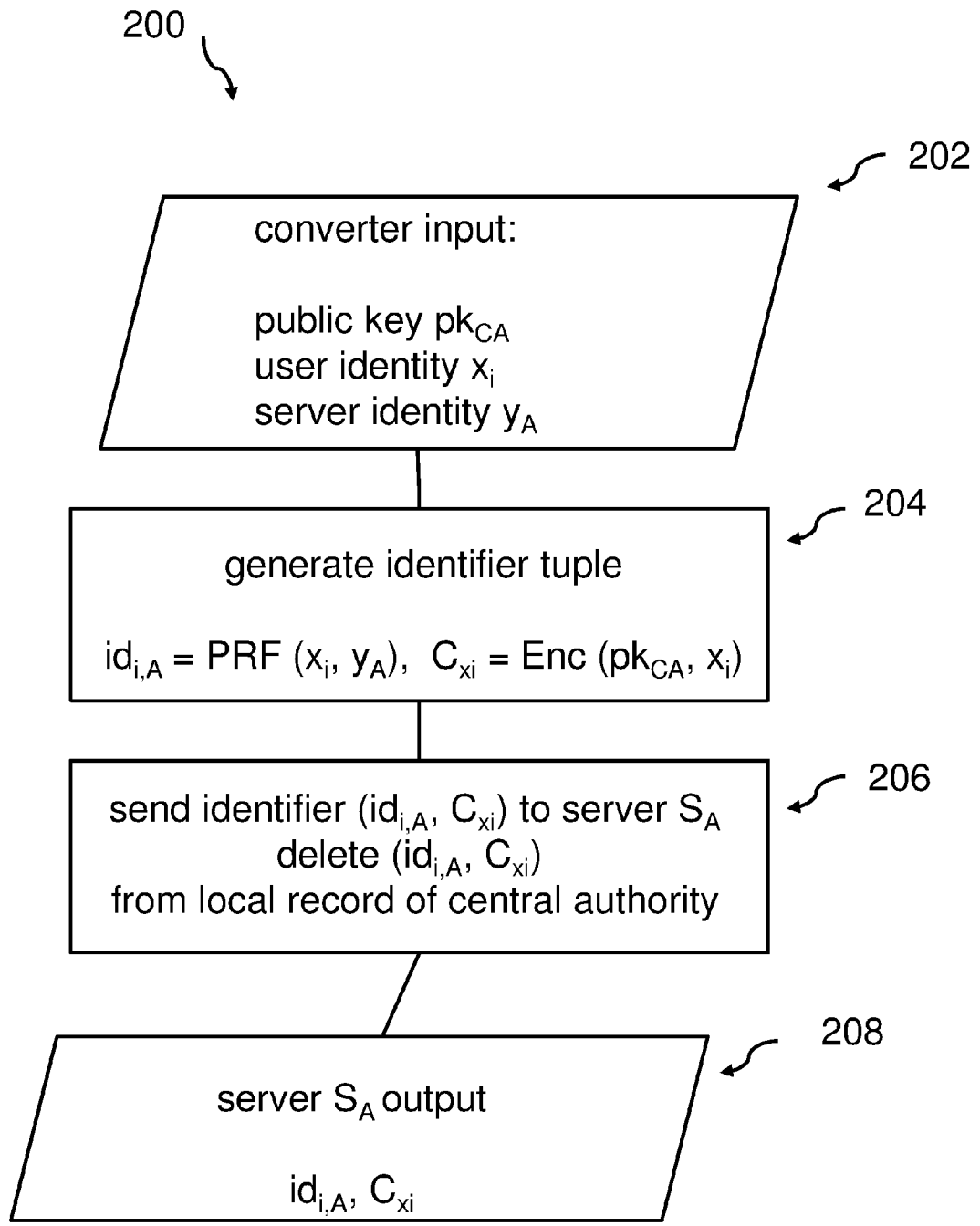
FIG. 2 shows a block diagram of a setup of the exemplary method.

The above described need may be addressed by a method for managing unlinkable identifiers for controlled privacy-friendly data exchange, a system for managing unlinkable identifiers for controlled privacy-friendly data exchange, a computing system, a data processing program, and a computer program product.

According to an embodiment of one aspect, a method for managing unlinkable identifiers for controlled privacy-friendly data exchange may be provided. The method may comprise distributing to a first database a first encrypted user identifier, a first database identifier, and a first database user identifier, as well as distributing to a second database a second encrypted user identifier, a second database identifier, and a second database user identifier.

Furthermore, the method may include receiving from the first database a third encryption and a fourth encryption. The third encryption may be formed from the first encrypted user identifier. The receiving may also comprise receiving the second database identifier, and a message comprised in the fourth encryption.

Additionally, the method may also include decrypting the third encryption thereby obtaining a decrypted value, deriving a blinded user identifier from the decrypted value, and sending the encrypted blinded user identifier and the fourth encrypted value to the second server thereby enabling the second server to compute the second database user identifier from the encrypted blinded database user identifier and the decrypted fourth encrypted value.

According to an embodiment of another aspect, a system for managing unlinkable identifiers for controlled privacy-friendly data exchange may be provided.

The system may include a distributing unit adapted for distributing to a first database a first encrypted user identifier, a first database identifier, and a first database user identifier, as well as distributing to a second database a second encrypted user identifier, a second database identifier, and a second database user identifier.

The system may also include a receiving unit adapted for receiving from the first database a third encryption and a fourth encryption, the third encryption being formed from the first encrypted user identifier, the second database identifier, and a message comprised in the fourth encryption.

In addition, the system may include a decrypting unit adapted for decrypting the third encryption thereby obtaining a decrypted value, a deriving unit adapted for deriving a blinded user identifier from the decrypted value, and a sending unit adapted for sending the encrypted blinded user identifier and the fourth encrypted value to the second server, thereby enabling the second server to compute the second database user identifier from the encrypted blinded database user identifier and the decrypted fourth encrypted value.

It may be noted that at least three systems may be involved in the transactions: a first server, a second server and a central authority, which may also be viewed as a central server being connected to the first and the second server.

It may also be noted that no query from one server to another server has been described. The method may only comprise identifications of records in different systems, e.g., a first server and a second server with help of a central authority. The final querying from one server to another server may be application specific.

It may be understood that the term managing (in particular, managing unlinkable identifiers) may be understood as generating and translating unlinkable identifiers.

It may also be assumed that the distribution may occur from a central server to one or more servers, in particular remote servers. Thus, the receiving may be a receiving by a central system or central authority system, or simply central authority.

In the context of this description, the following conventions, terms and/or expressions may be used:

The term 'unlinkable database user identifiers' may denote identifiers to, e.g., personal data of a person that may not be disclosed to another system, server or person, even if joint analysis of data, belonging to the same physical person, may be involved.

The term "first encrypted user identifier" may denote an encrypted form of a first user identifier. It may be encrypted using a public key of a central authority, e.g. $pk_{CA}$. The same applies to a "second encrypted user identifier".

The term 'first database identifier' may denote an identifier of a database on a first physical server, e.g., server $S_A$. In a similar way, a 'second database identifier' may be defined for a second physical server, e.g., server B.

The term 'first database user identifier' may denote an identifier for a given user on a first server or in a first database. It may be generated using a pseudo random function PRF. In a similar way, a 'second data base user identifier' may be defined for a given user on a second server (or database).

The term "blinded" may denote a value that may not be interpretable by a central authority if received by a first server $S_A$ and transferred to a second server $S_B$. If received by the second server it may unblind the value.

The term "server" may denote a computing system in a physical form or in a virtual form. This way, two virtual server, may reside on a physical server. Also the central authority may be a physical or virtual server.

The proposed method for managing unlinkable identifiers for controlled privacy-friendly data exchange may offer a couple of advantages. Embodiments described herein overcome current trade-off situations of having data exchange systems that are either controlled or either privacy-friendly. The design of the method and system embodiments disclosed herein follows an approach with a central authority, e.g., called 'converter', that may establish individual user-identifiers for each server derived from a unique main identifier that every user may have. One of the differences with respect to prior art is that, while the converter may still be the only authority that may link different identifiers together, it cannot recognize the particular user for which such a translation may be requested. The converter cannot even tell if two data exchanges where done for the same user or for different ones. More precisely, the disclosed method and system may provide mechanisms for building distributed data exchange systems with the following properties:

Server Unlinkability: Each server may know the user only under a local identifier which is each provided by—or with the help of—the converter. Different servers may not be able to link their local user-identifier together, or derive information about the main identifier of the user.

Controlled Data Exchange: The converter may be the only authority that may convert the local user-identifier from one domain to another. Thus, the converter may need to be involved in every data exchange request.

Query Privacy: The converter, when processing a data exchange request, may not learn for which particular user the data request may be performed. That is, the converter may also not tell if two data exchanges where done for the same user account or for two different ones.

Converter Unlinkability: The converter, i.e., the central authority, does not know the server-local identifier it may (partially) derive for the servers. Thus, even when the converter may get access to all (or several) server databases, but the servers themselves are not corrupted, it may not be able to link the different records together. The converter is still the crucial entity to establish identifiers and link them together, but it will not see the final derivations of its computations anymore.

Privacy-Friendly User Access: The user may request access to his data records at each server. This may require strong authentication that, at the same time, does not violate the unlinkability and privacy properties of the rest of the system.

According to a further embodiment of the method, the first encrypted user identifier, e.g., $C_{xi}$, may be generated using an encryption function using as input a public key, e.g. $pk_{CA}$, of a central authority—which may be represented by the converter—and a user identity, i.e., $x_i$, such that in particular:

$$C_{xi} = Enc_{pkCA}(x_i).$$

According to one embodiment of the method, the first database user identifier may be generated using a pseudo random function PRF, such that in particular $$id_{i,A} = PRF(x_i, y_A),$$

using as input a user identity $x_i$ and the first database identifier $y_A$ of the first database which may run on the first server.

According to embodiments of the method, the second encrypted user identifier may be generated using the encryption function using a public key of a central authority, i.e., $pk_{CA}$, and a user identity, i.e. $x_i$, as input. However, because of the characteristic of a cyphertext the expression $C_{xi} = Enc(pk_{CA}, x_i)$ generates here a different result than in the case of the first database user identifier.

According to embodiments of the method, the second database user identifier may be generated using the pseudo random function, such that in particular $$id_{i,B} = PRF(x_i, y_B),$$

using as input the user identity $x_i$ and the second database identifier $y_B$.

According to an advanced embodiment of the method, the first database user identifier, i.e., $id_{i,A}$, the second database user identifier, i.e., $id_{i,B}$, the first encrypted user identifier and the second encrypted user identifier may be deleted, in particular by the central authority, after the distribution to the first database and the distribution to the second database, respectively. That is, after sending to the first server and the second server. Hence, the central authority may have no memory about the construction of the set-up of the involved variables.

According to embodiments of the method, the distributing to the first database may be performed by the central authority and the first database may run on a first server. Accordingly, the distributing to the second database may be performed by the central authority and the second database may run on a second server. Thus, the central authority—which may be a central server, also called converter—may be physically decoupled from the first server and the second server but in communicative contact to both, the first and the second server.

According to an even enhanced embodiment of the method, the method may additionally comprise generating a blinded encrypted expression comprising the first database identifier, i.e., $y_A$, after receiving the first encrypted user identifier, i.e., $C_{xi}$. The blinding may be performed by r which may be an integer value.

This may be seen as a more sophisticated approach for setting up the whole method and system. The "blinding" may be achieved by "r" such that the blinded expression may be built by:

$$(C_{xi} \Theta Enc_{pkCA}(y_A))^r.$$

The "blinding" may be performed by the server $S_A$.

Afterwards a distributing of the first database identifier in a blinded, encrypted form may be performed using thereby the encrypted user identifier.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAY), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of the inventive method, according to claim 1, is given. Afterwards, further embodiments and a related system will be described.

FIG. 1 shows a block diagram of the method 100 for managing unlinkable identifiers for controlled privacy-friendly data exchange. As shown, the method 100 may include distributing, at block 102, to a first database, in particular from a central authority a first encrypted user identifier to a first server $S_A$, a first database identifier. This may be known by the central authority for the database running on server $S_A$. Additionally, a first database user identifier may be distributed from the center authority to server $S_A$.

Similarly, the method may include distributing, at block 104, to a second database a second encrypted user identifier, a second database identifier, and a second database user identifier.

The central authority may then receive, at block 106, from the first database a third encryption, in particular under the public key of the central authority, and a fourth encryption. The third encryption may be formed from the first encrypted user identifier, the second database identifier, and a message, in particular a randomizer "r", comprised in the fourth encryption.

Additionally, the method may include decrypting, at block 108, in particular on the central authority the third encryption thereby obtaining a decrypted value (in particular, rid which is the blinded DB user identifier) and deriving, at block 110, in particular by the central authority, a blinded user identifier from the decrypted value.

Then, the method includes sending, at block 112, in particular by the central authority the encrypted (by public key of server B) blinded user identifier and the fourth encrypted value to the second server thereby enabling the second server to compute the second database user identifier from the encrypted blinded database user identifier and the decrypted fourth encrypted value.

It may be noted that the method may not comprise any query from server $S_A$ to server $S_B$, or vice versa. The method may only comprise an anonymous identification of records relating to the same person or user, e.g., $x_i$. The query itself may be application-specific and may use the proposed method of the anonymous identification of records in a database.

FIG. 2 shows a block diagram 200 of a setup of the proposed method. In order to explain the scenario, and under the assumption that as system parameters a cyclic group G of order q and generator g may be used, the following may be considered:

As a general remark it may be mentioned that the symbol "$\leftarrow_R$" may denote that the result of the respective operation may be generated by a randomized process.

Converter: The converter CA may be the central authority that may derive and distribute local identifiers $id_{i,A}$ for user $U_i$ (with main identifier $x_i$) and data holder or server $S_A$ (with main identifier $y_A$, resp., $g^{y_A}$ in the second construction, see below). The converter is also the only party that can transform $id_{i,A}$ into $id_{i,B}$, but without learning the underlying $x_i$. In the first construction, the converter always computes the full identifier $id_{i,A}$, whereas in the second construction (see below) it derives only blinded versions of those identifiers, which are then unblinded by the target server, e.g., server B.

The converter may generate a key pair (public key: $pk_{CA}$, secret key: $sk_{CA}$)$\leftarrow_R$ KeyGen($1^n$) of a homomorphic encryption scheme (KeyGen, Enc, Dec) that may support additive operations on the ciphertexts. More precisely, the encryption scheme must support an efficient operation $\Theta$ on ciphertexts such that, if $C_1 \leftarrow_R Enc_{pk}(m_1)$ and $C_2 \leftarrow_R Enc_{pk}(m_2)$, then $C_1 \Theta C_2 \in Enc_{pk}(m_1+m_2)$. To denote the repeated application of $\Theta$ we write the amount of repetitions in the exponent, e.g., we write $C_1^2$ to denote $C_1 \Theta C_1$.

Server: A server $S_A$ may maintain user data, where a user $U_i$ may be known to it as $id_{i,A}$. It can request access to user data that is maintained by some other servers $S_B$ via the converter.

Each server $S_A$ may generate a key pair (public key: $pk_A$; secret key:$sk_A$)$\leftarrow_R$ KeyGen($1^n$) of an encryption scheme and a main identifier $y_A \in Z_q$. In the first construction, this identifier $y_A$ is known to the converter, whereas in our second construction this value is kept secret and only the derivation $h_A = g^{y_A}$ is made public to the converter and the other servers.

User: A user $U_i$ has a unique identity $x_i \in Z_q$, which is known to (or even generated by) the converter. To allow users to access their data held by the different servers, every user may obtain a privacy-enhancing credential $cred_{x_i}$ issued by the converter. The credential may contain $x_i$ as attribute.

Returning now to FIG. 2: A converter running on the central authority may use as input variables the public key of the central authority $pk_{CA}$, the known user identity $x_i$, and the known server identity $y_A$ of server $S_A$—compare block 202. The central authority and the converter may be used as synonyms.

In block 204, an identifier tuple may be generated according to $$id_{i,A} = PFR(x_i, y_A), C_{xi} = Enc_{pkCA}(x_i), \text{wherein}$$

PRF is a pseudo random function. It may be noted that throughout the figures the expression $C_{xi} = Enc_{pkCA}(x_i)$ may also be written as $C_{xi} = Enc(pk_{CA}, x_i)$. Both expression and comparable notations may be regarded as equivalent.

In block 206, these variables $id_{i,A}$ and $C_{xi}$ are sent to the server $S_A$ and may potentially be deleted by the converter from its local record. Thus, the server $S_A$ has $id_{i,A}$, $C_{xi}$; compare block 208. And the central authority "may have forgotten", i.e., deleted, the variables $id_{i,A}$ and $C_{xi}$ from local memory.

With other words, the first setup or first construction assumes that the converter may know all involved server identifiers $y_A$, $y_B$, . . . and makes encryptions of them available to all servers. More precisely, the central authority CA creates ciphertexts $C_A \leftarrow Enc_{pkCA}(y_A)$, $C_B \leftarrow Enc_{pkCA}(y_B)$, . . . for all server identifiers under its own public key $pk_{CA}$ and sends them to all servers.

The generation of the server-local identifiers is done by the converter on input of the user-identities $x_i$ from all users and the server identifiers $y_A$ from all servers. The local identity for user $U_i$ with $x_i$ and a server $S_A$ with key $y_A$ is the tuple
$(id_{i,A}, C_{xi})$ computed as $$id_{i,A} \leftarrow g^{(1/(xi+yA))} \text{ and } C_{xi} \leftarrow_R Enc_{pkCA}(x_i).$$

This is done per server for all user's identifiers $x_i$ and $i=1, \ldots, n$. As known, the function $g^{(1/(xi+yA))}$ is a good pseudo-random function, i.e., a server, not knowing $x_i$, cannot distinguish the received value from a random value, and thus (roughly speaking) it does not learn anything about the main user-identifier which would allow him to fully identify the user or to link his local-identifier with the local-identifier of another server.

It may also be noted that the encryption of $x_i$ is a randomized procedure as well, i.e., different encryptions of the same main identifier $x_i$ will yield different ciphertexts $C_{xi}$. The semantic security of the encryption scheme guarantees that the ciphertext does not leak information about the plaintext, and thus an adversary cannot even tell whether two ciphertexts encrypt the same value or not.

Figure 3:
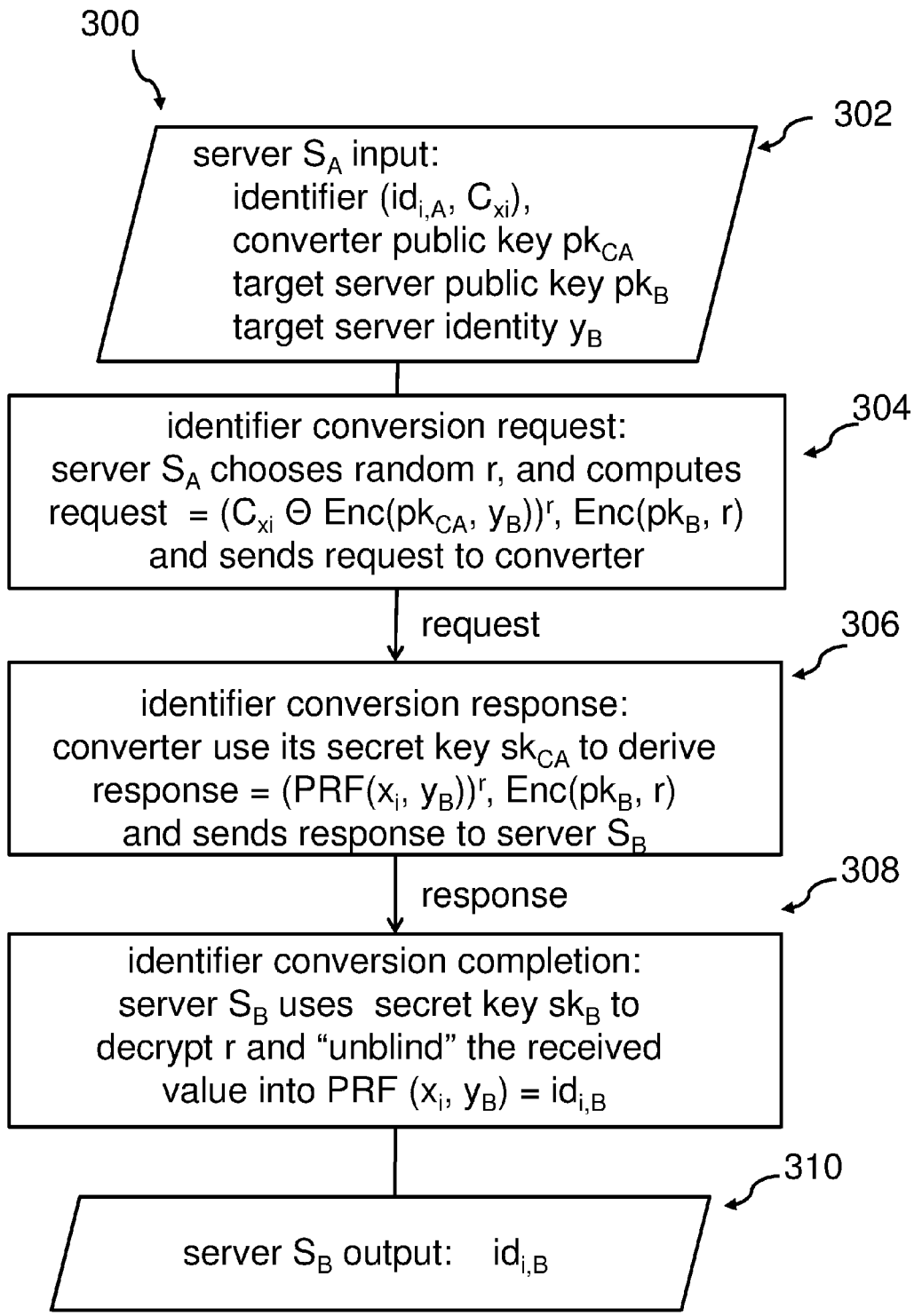
FIG. 3 shows a block diagram of a usage of the exemplary method.

FIG. 3 shows a block diagram 300 of a usage of the method to derive the local identifiers $id_{i,B}$ on server $S_B$.

If a server $S_A$ wants to request data for the user known to it as $(id_{i,A}, C_{xi})$ from a server $S_B$, it requests the translation of this identifier to the namespace of $S_B$ as follows:

Server $S_A$ uses as input: the identifier $(id_{i,A}, C_{xi})$, the converter public key $pk_{CA}$, the target server public key $pk_B$, and the target server identity $y_B$. See block 302.

An identifier conversion may be performed as follows, at block 304: The server $S_A$ initiates the request by sending the tuple $(C_B, C_{rid}, C_r, \pi A)$ to CA, where $C_B$ is the encrypted identifier (a hash would suffice here as well, as it is merely for indicating the target server for the request) of $S_B$ and the ciphertexts are computed as follows:

$$C_{rid} \leftarrow_R (C_{xi} \odot C_B)^r \text{ and } C_r \leftarrow_R Enc_{pkB}(r) \text{ for some}$$
$$r \leftarrow_R Z_q$$

$S_A$ also proves that those ciphertexts are computed correctly in a NIZK $\pi_A$:

$$\pi_A \leftarrow NIZK\{(C_{xi}, r): C_{rid} = (C_{xi} \odot C_B)^r \wedge C_r = Enc_{pkB}(r)\}$$
$$(C_{rid}).$$

When the ciphertexts were computed correctly we have $C_{rid} = Enc_{pkCA}((x_i + y_B)r)$ due to the homomorphic property of the encryption scheme. The server stores r and sends $(C_B, C_{rid}, C_r, \pi_A)$ to the trusted authority.

Side remark: NIZK denotes a non-interactive zero-knowledge proof system that allows proving certain relations among different ciphertexts. Here a somewhat informal notation may be used for this proof system. For instance, one may write $$\pi \leftarrow NIZK\{(m): C_1 = Enc_{pk1}(m) \wedge C_2 = Enc_{pk2}(m)\}(ctxt)$$

to denote the generation of a non-interactive zero-knowledge proof that is bound to a certain context ctxt and proves that $C_1$ and $C_2$ are both proper encryptions of the same message m under the public key $pk_1$ and $pk_2$ for the encryption scheme Enc.

In more detail, the identifier conversion response may be performed as follows, at block 306:

The converter $C_A$, upon receiving a valid tuple $(C_B, C_{rid}, C_r, \pi_A)$, decrypts $C_{rid}$ to $rid \leftarrow Dec_{skCA}(C_{rid})$, computes the randomized server-local identifier $rid' \leftarrow g^{(1/rid)}$ and sends $$C_{rid'} \leftarrow_R Enc_{pkB}(rid') \text{ together with } C_r \text{ to server } S_B.$$

An identifier conversion may be performed as indicated in 308: The server $S_B$, upon receiving $(C_{rid'}, C_r)$ decrypts $$rid' \leftarrow Dec_{skB}(C_{rid'}) \text{ and } r \leftarrow Dec_{skB}(C_r).$$

It then computes the final value $(rid')^r$. If everything was computed correctly, we have $$(rid')^r = (g^{(1/rid)})^r = g^{(r/(xi+yB)r)} = g^{(1/(xi+yB))} = id_{i,B}.$$

Thus, $S_B$ has re-derived its server-local identifier $id_{i,B}$ for the user with main identifier $x_i$ that $S_A$ knows as $id_{i,A}$—see block 310.

The server $S_B$ can now retrieve the requested data for that user and return it to $S_A$. To indicate to which user-account, or rather which query, the answer belongs to (as $S_A$ may have sent several requests to $S_B$) both servers could, e.g., use the ciphertext $C_r$ as query-identifier.

This construction provides server unlinkability, controlled data exchange and query privacy. However, the construction may require still rather strong trust in the converter, as the converter has all the information to re-compute (and thereby link) the different server-local identifiers that are established for the same users on the different servers. Thus, it does not achieve converter unlinkability.

The disclosed second construction (compare FIG. 4, 5) is an extension of the first scheme (as shown above) that, in addition to the aforementioned security properties, also provides the stronger guarantee of converter unlinkability.

Figure 4:
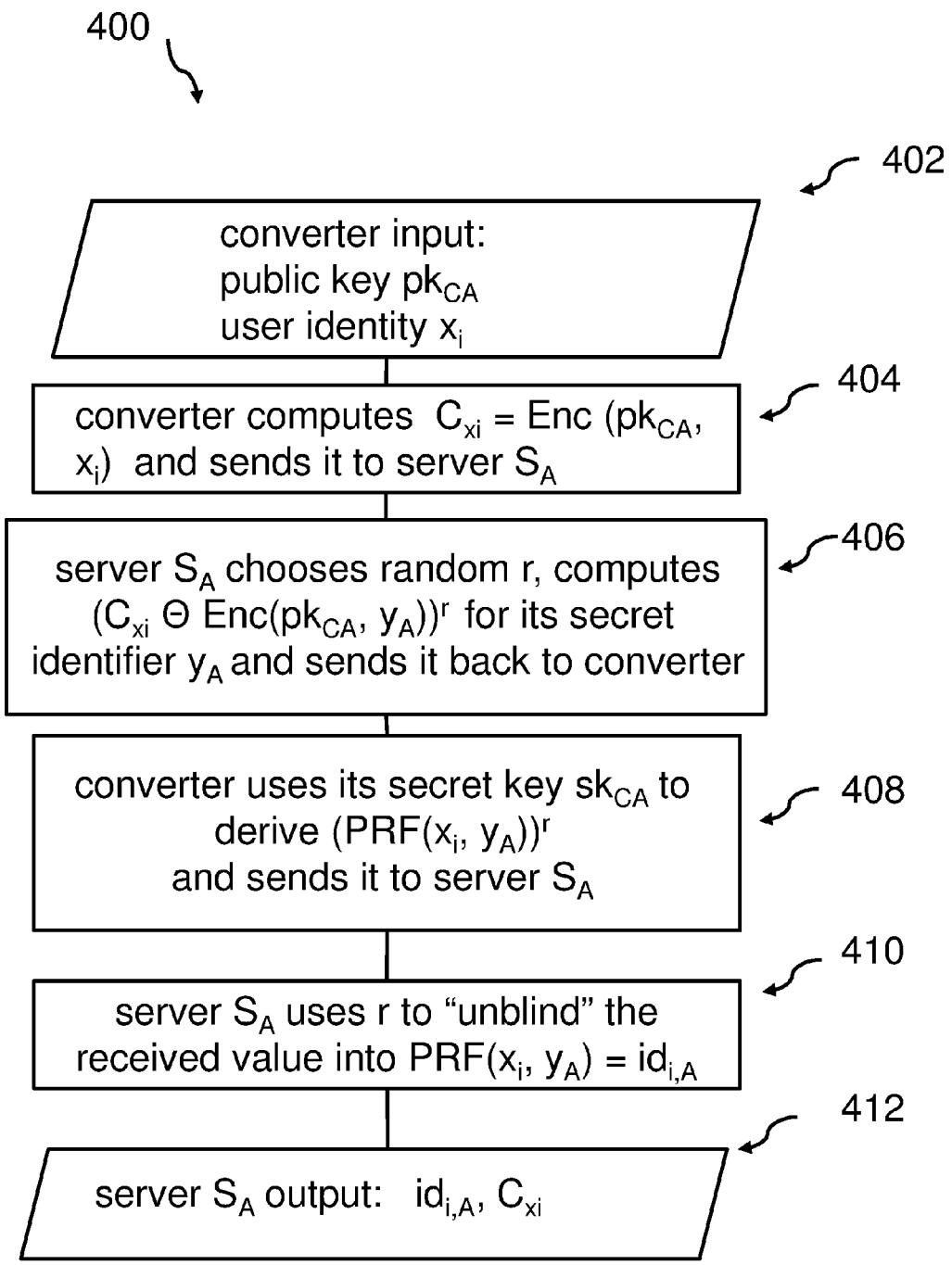
FIG. 4 shows a block diagram of a more sophisticated setup of the exemplary method.

FIG. 4 shows a block diagram 400 of a more sophisticated setup of the method.

In a short version, it may be described as follows:

As converter input the public key $pk_{CA}$ and the user identity $x_i$ may be used, see block 402. In a first step, the converter CA computes $$C_{xi} = Enc(pk_{CA}, x_i) \text{ and sends it to server } S_A, \text{ see block}$$
$$404.$$

In block 406, the server $S_A$ chooses a random "r", computes $$C_{xi} \odot (Enc(pk_{CA}, y_A))^r$$

for its secret identifier $y_A$ and sends it back to converter CA.

In a next step (see block 408) the converter CA uses its secret key $sk_{CA}$ to derive:

$$(PRF(x_i, Y_A))^r$$

and sends it back to server $S_A$. Then—compare block 410—server $S_A$ uses "r" to "unblind" the received values into $$PRF(x_i, y_A) = id_{i,A}.$$

Server $S_A$ has thus as output the values: $id_{i,A}$, $C_{xi}$—see 412.

In a longer more detailed explanation, the situation in case of the alternative construction may be understood as follows. Here, in this alternative construction the amount of trust needed for the converter by letting the servers compute their final database user identifiers themselves may be reduced. That is, the converter is still the crucial entity to establish and convert the identifiers, but it does not learn the final values of the database user identifiers anymore. To do so, the server's identifier keys $y_A$ are not known to the converter anymore, but are kept secret by the servers. The servers now publish $h_A = g^{y_A}$ as their main identifier and will transmit $y_A$ in the protocol only in "blinded" versions.

The generation of the database user identifiers is now done jointly by the converter and each server, $S_A$, $S_B$.

The setup of the system may be described in four steps:

Identifier generation step 1: The process may be started by the converter who sends the set of user identifiers x, encrypted under his own public key to a server $S_A$:

$$\{C_{xi}\}_{i=1, \ldots, n} \text{ where } C_{xi} \leftarrow_R Enc_{pkCA}(x_i)$$

Identifier generation step 2: The server $S_A$, upon receiving a set $\{C_{xi}\}_{i=1, \ldots, n}$, computes $$C_{rid,i} \leftarrow_R (C_{xi} \Theta (Enc_{pkCA}(y_A)))^{r_i}$$

for a random $r_i \leftarrow_R Z_q$ and for $i=1, \ldots, n$. It stores all $r_i$, computes for each value a proof of correctness $\pi_{A,i}$ as $$\pi_{A,i} \leftarrow NIZK\{(y_A, r_i): C_{rid,i} = (C_{xi} \Theta Enc_{pkCA}(y_A))^{r_i} \wedge h_A = g^{y_A}\}(C_{rid,i}),$$

and sends $\{(C_{rid,i}, \pi_{A,i})\}_{i=1, \ldots, n}$ to the central authority CA.

In a third step, the converter, upon receiving a set $\{C_{rid,i}, \pi_{A,i}\}_{i=1, \ldots, n}$, verifies all $\pi_{A,i}$ and decrypts the ciphertexts obtaining $rid_i \leftarrow Dec_{skCA}(C_{rid,i})$. If $C_{rid,i}$ was computed correctly, we have $rid_i = (x_i + y_A) r_i$. The converter finally computes $$rid'_i \leftarrow g^{(1/rid_i)} \text{ for all } i \text{ and returns } \{rid'_i\}_{i=1, \ldots, n} \text{ to } S_A.$$

In a final step for this second kind of identifier construction, i.e., setup, the server $S_A$, upon receiving a set $\{rid'_i\}_{i=1, \ldots, n}$, de-randomizes those identifiers using the random $r_i$ generated in step 2 by computing $id_{i,A} \leftarrow rid'^{r_i}_i$ for $i=1, \ldots, n$. If all ciphertexts were computed correctly, we have $id_{i,A} = g^{(1/(x_i + y_A))}$. The server stores the tuples $(id_{i,A}, C_{xi})$ as local identifier for $U_i$. That is, the values are the same as in the first construction, just the derivation has changed.

Figure 5:
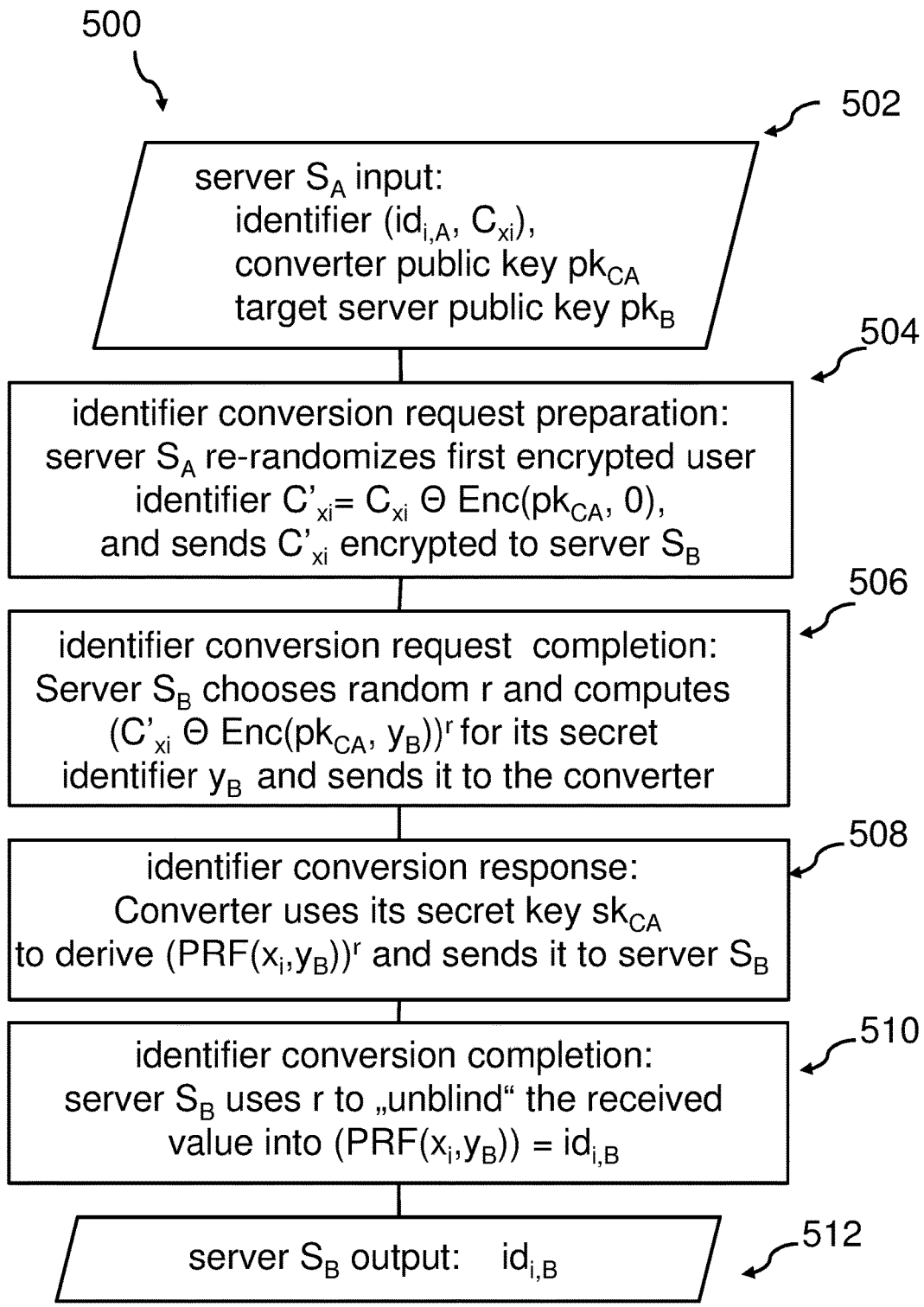
FIG. 5 shows a block diagram of a usage of the more sophisticated method.

FIG. 5 shows a block diagram 500 of the usage of the more sophisticated method. It may be recalled that in the second construction the converter does not know the server identifier keys $y_A$, $y_B$, . . . As a consequence, the converter also does not distribute encryptions $C_A$, $C_B$, . . . of those server identifiers, encrypted under his own public key, anymore. In the first construction, those encrypted identifiers were used when a server was computing the conversion request. Thus, one has to modify that step in the second construction. That is, when a server $S_A$ requests a conversion of an identifier $(id_{i,A}, C_{xi})$ to the namespace of a server $S_B$, then $S_B$ has to contribute to this request before it can be sent to the converter.

The conversion for this embodiment may work as follows:

In block 502, the following variables may be used as input: the identifier $id_{i,A}$, the public key of the converter $pk_{CA}$, and the target server public key $pk_B$.

The conversion of the identifier from one server $S_A$ to another server $S_B$ may be described in several steps:

Identifier request preparation, block 504: The server $S_A$ that wishes to convert a user identifier $(id_{i,A}, C_{xi})$ to the namespace of a server $S_B$, starts its request by re-randomizing $C_{xi}$. To this end, it computes $C'_{xi} \leftarrow_R C_{xi} \Theta Enc_{pkCA}(0)$ (i.e., $C'_{xi}$ is still an encryption of $x_i$) and sends the result encrypted under $S_B$'s public encryption key as $C''_{xi}$ $$\leftarrow_R Enc_{pkB}(C'_{xi}) \text{ to } S_B.$$

Identifier request completion, block 506: The target server $S_B$, upon receiving $C''_{xi}$, first decrypts it to $C'_{xi} \leftarrow Dec_{skB}(C''_{xi})$. It then completes the request by combining $C'_{xi}$ with a blinded encryption of his identifier key $y_B$ under the converters public key. More precisely, it chooses a random $r \leftarrow Z_q$ and computes $$C_{rid} \leftarrow_R (Enc_{pkCA}(y_B) \Theta C'_{xi})^r.$$

$S_B$ also proves correctness of the computed ciphertext in $\pi_B$:

$$\pi_B \leftarrow NIZK\{(y_B, C'_{xi}, r): C_{rid} = (Enc_{pkCA}(y_B) \Theta C'_{xi})^r \wedge h_B = g^{y_B}\}(C_{rid}).$$

If the encryptions were done correctly we have $$C_{rid} = Enc_{pkCA}((x_i y_B) r).$$

$S_B$ stores $r$, $C'_{xi}$ and sends $(C_{rid}, \pi_B)$ to the converter CA.

In this case, the response is performed as shown in block 508:

The converter, upon receiving a ciphertext $C_{rid}$, decrypts it to $rid \leftarrow Dec_{skCA}(C_{rid})$, computes $rid' = g^{(1/rid)}$ and sends $rid'$ to $S_B$. If everything was computed correctly we have $rid' = g^{(1/(xi+yB)r)}$. The conversion is finally performed according to block 510:

The server $S_B$, upon receiving $rid'$ computes $id_{i,B} \leftarrow rid'^r = g^{(1/(xi+yB))}$ using the $r$-value stored in Step 2 of the conversion request—see 512.

When the server $S_B$ subsequently responds to the request of $S_A$ it has to indicate to which user-account, or rather which query, the answer belongs to. To do so, server $S_A$ could have either sent and stored a query identifier linked to $id_{1,A}$, or they use $C'_{xi}$ (computed in the first step) as such an identifier. If they do the latter, $C'_{xi}$ must always be sent encrypted, otherwise the converter could determine the user identity for which the data is exchanged.

Based on the previous paragraphs, user, may access data on different server, in the following way: If a user $U_i$ with main identity $x_i$ wants to access his data record that is held by a server $S_B$, he needs to derive his server-local identifier $id_{i,B}$ and prove that it indeed belongs to him. Again, this should not harm the user's privacy and unlinkability of the data records, i.e., the authentication procedure should neither leak information about $x_i$ nor should several authentications at different servers be linkable. To do so, each user obtains a privacy-enhancing credential $cred_{xi}$ from the converter (or another trusted authority) that contains and certifies xi under a public key cpk. Using Idemix [Jan Camenisch and Anna Lysyanskaya. A signature scheme with efficient protocols. In S. Cimato, C. Galdi, and G. Persiano, editors, Security in Communication Networks, Third International Conference, SCN 2002, volume 2576 of Lecture Notes in Computer Science, pages 268-289, Springer Verlag, 2003] as credential, technology allows to subsequently prove the possession of such a credential without revealing xi and to further prove statements over xi. Those proofs are unlinkable, i.e., several proofs, even of the same statement, cannot be linked together. Here, verify($cred_A$, a, cpk) may denote the verification algorithm that checks if credential $cred_A$ is a valid credential on attribute a under public key cpk.

The following description shows how those credentials can be used to give users access to their data without harming the unlinkability and privacy properties of our scheme. We provide a description of the second construction, but a similar combination can be done with our first construction as well.

User Request & Authentication: To securely login to server $S_B$, the user first encrypts his identifier $x_i$ under the converters key as $C_{xi} \leftarrow \text{Enc}_{pkCA}(x_i)$, and proves that he owns a valid credential for that identifier in $\pi_U$:

$$\pi_U \leftarrow \text{NIZK}\{(x_i, \text{cred}_{xi}) : \text{Verify}(\text{cred}_{xi}, x_i, cpk) = \text{true}^\wedge C_{xi} = (\text{Enc}_{pkCA}(x_i))\}(C_{xi}),$$

the user sends $$(C'_{xi}, \pi_U) \text{ with } C'_{xi} \leftarrow_R \text{Enc}_{pkB}(C_{xi}) \text{ to } S_B.$$

Identifier Derivation. The server $S_B$, upon receiving a tuple $$(C'_{xi}, \pi_U), \text{first decrypts } C'_{xi} \text{ to } C_{xi} \text{ and then verifies } \pi_U \text{ wrt}$$

the decrypted value. If the verification succeeds, i.e., the user has correctly proven his "ownership" of $x_i$, the server proceeds similarly as in the identifier conversion. That is, it extends the ciphertext with the encryption of its own identifier as
$C_{rid} \leftarrow_R (C_{xi} \ominus \text{Enc}_{pkCA}(y_B))^r$ for some random $r \leftarrow_R \mathbb{Z}_q$ and proves the correctness of his computation in $\pi_B$:

$$\pi_B \leftarrow \text{NIZK}\{(y_B, C_{xi}, r) : C_{rid} = (\text{Enc}_{pkCA}(y_B) \ominus C_{xi})^r \wedge h^B = g^{y_B}\}(C_{rid}).$$

$S_B$ then sends $(C_{rid}, \pi_B)$ to the converter. The following steps are equivalent to steps identifier conversion/response and identifier conversion/completion of the identifier conversion protocol. That is, at the end of the protocol, the server $S_B$ has re-computed its local identifier $id_{i,B}$ for $U_i$ and can grant the user access to the associated data.

Figure 6:
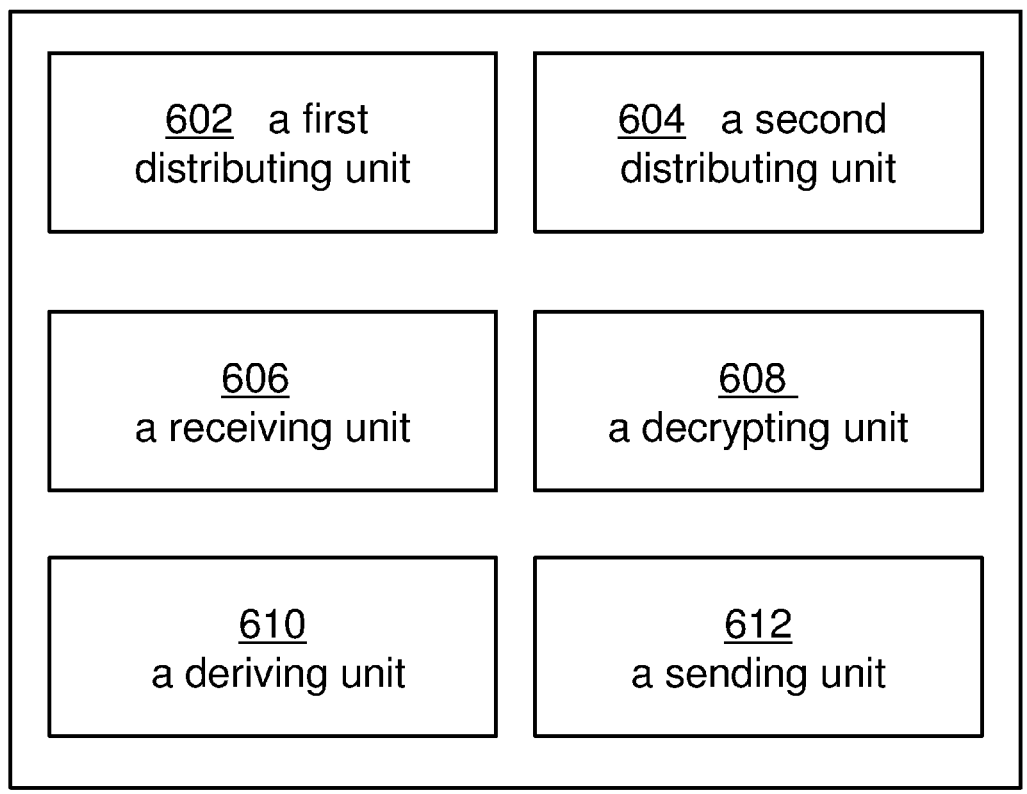
FIG. 6 shows a block diagram of a system for managing unlinkable identifiers for controlled privacy-friendly data exchange.

FIG. 6 shows a system 600 for managing unlinkable database user identifiers. Different units of the system may be comprised in different computing systems. The system 600 may include a first distribution unit 602 adapted for distributing to a first database, in particular from a central authority, a first encrypted user identifier, a first database identifier, in particular known by the central authority, and a first database user identifier.

The system 600 may also include a first distribution unit 604 adapted for distributing to a second encrypted user identifier, a second database identifier, and a second database user identifier.

Furthermore, there may be a receiving unit 606 provided which may be adapted for receiving, in particular by the central authority, from the first database a third encryption under the public key of the central authority and a fourth encryption. The third encryption may be formed from the first encrypted user identifier. Also receivable may be a second database identifier, and a message, in particular a randomizer "r", comprised in the fourth encryption.

Also part of the system 600 may be a decrypting unit 608 adapted for decrypting (in particular by the central authority) the third encryption thereby obtaining a decrypted value, e.g., rid which may be the blinded database user identifier.

Another component of the system 600 may be a deriving unit 610 adapted for deriving a blinded user identifier from the decrypted value, and a sending unit 612 adapted for sending, in particular by the central authority, the encrypted (by PK of server B) blinded user identifier and the fourth encrypted value to the second server thereby enabling the second server to compute the second database user identifier from the encrypted blinded database user identifier and the decrypted fourth encrypted value.

Figure 7:
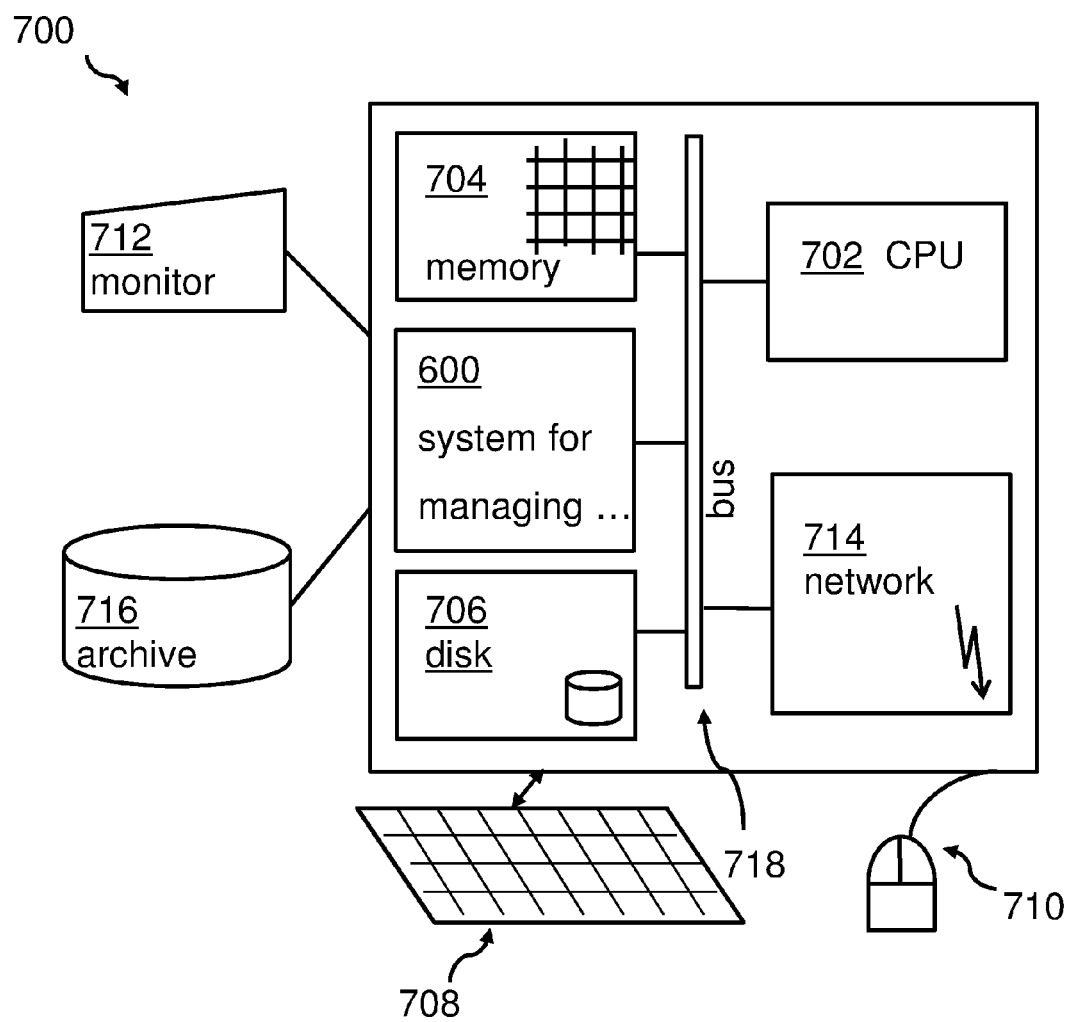
FIG. 7 shows a block diagram of a computing system that may be used for different sub-systems of the system for managing unlinkable identifiers for controlled privacy-friendly data exchange.

FIG. 7 shows a computing system 700 that may be used for different partial systems for the system for managing unlinkable database user identifiers. The central authority or converter and each server $S_A$ and $S_B$ may be built in the way of the computing system 700.

Embodiments of the invention may be implemented together with virtually any type of computer, regardless of the platform being suitable for storing and/or executing program code. For example, as shown in FIG. 7, a computing system 700 may include one or more processor(s), like the execution unit or CPU 702 with one or more cores per processor, associated memory elements 704, an internal storage device 706 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 704 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, the computer 700 may comprise further execution units, like the FGPA 703 and/or the graphics processing unit 705 (GPU), for accelerating processing of program code in the computer system or heterogeneous computing system 700. Furthermore, each of the computing system involved in the overall system may comprise special elements coupled to the bus system 718; e.g., a sending unit 612, a distribution unit 602, 604 and/or a receiving unit 606, a decryption unit 608, and/or a deriving unit 610 as individual modules or as a complete module 600.

The computing system 700 may also include input means, such as a keyboard 708, a pointing device such as a mouse 710, or a microphone (not shown). Alternatively, the computing system may be equipped with a touch sensitive screen as main input device. Furthermore, the computer 700, may include output means, such as a monitor or screen 712 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing unlinkable database user identifiers, the method comprising:
distributing, by a central authority having a computer processor, a to a first database ran on a first server a first encrypted user identifier, a first database identifier, and a first database user identifier, wherein the first encrypted user identifier is generated using an encryption function using a public key of the central authority and a user identity as input and wherein the first database user identifier is generated using a pseudo random function using as input a user identity and the first database identifier;

distributing, by the central authority, to a second database ran on a second server a second encrypted user identifier, a second database identifier, and a second database user identifier;

receiving from the first database a third encryption and a fourth encryption, the third encryption being formed from the first encrypted user identifier, the second database identifier, and a message comprised in the fourth encryption;

decrypting the third encryption thereby obtaining a decrypted value;

decrypting the fourth encryption thereby obtaining a decrypted fourth encryption;

deriving a blinded user identifier from the decrypted value; and encrypting the blinded user identifier and sending the encrypted blinded user identifier and the decrypted fourth encryption to the second server thereby enabling the second server to compute the second database user identifier from the encrypted blinded user identifier and the decrypted fourth encryption, wherein the first encrypted user identifier, the second encrypted user identifier, the first database user identifier and the second database user identifier are deleted after the distribution to the first database and the distribution to the second database, respectively, to provide secure cross-server data access to private data of individuals and to prevent cross-identification of personal data across the servers.

2. The method of claim 1, wherein the second encrypted user identifier is generated using an encryption function using a public key of a central authority and a user identity as input.

3. The method of claim 1, wherein the second database user identifier is generated using a pseudo random function using as input a user identity and the second database identifier.

4. A system for managing unlinkable database user identifiers, comprising:

a computer processor implemented first distribution unit adapted to distribute, by a central authority to a first database ran on a first server a first encrypted user identifier, a first database identifier, and a first database user identifier, wherein the first encrypted user identifier is generated using an encryption function using a public key of the central authority and a user identity as input and wherein the first database user identifier is generated using a pseudo random function using as input a user identity and the first database identifier;

a computer processor implemented second distribution unit adapted to distribute, by the central authority to a second database ran on a second server a second encrypted user identifier, a second database identifier, and a second database user identifier;

a computer processor implemented receiving unit adapted to receive from the first database a third encryption and a fourth encryption, the third encryption being formed from the first encrypted user identifier, the second database identifier, and a message comprised in the fourth encryption;

a computer processor implemented decrypting unit adapted to decrypt the third encryption thereby obtaining a decrypted value and to decrypt the fourth encryption thereby obtaining a decrypted fourth encryption;

a computer processor implemented deriving unit adapted to derive a blinded user identifier from the decrypted value; and a computer processor implemented sending unit adapted to encrypt the blinded user identifier and send the encrypted blinded user identifier and the decrypted fourth encryption to the second server thereby enabling the second server to compute the second database user identifier from the encrypted blinded user identifier and the decrypted fourth encryption, wherein the first encrypted user identifier, the second encrypted user identifier, the first database user identifier and the second database user identifier are deleted after the distribution to the first database and the distribution to the second database, respectively, to provide secure cross-server data access to private data of individuals and to prevent cross-identification of personal data across the servers.

5. The system of claim 4, wherein the second encrypted user identifier is generated using an encryption function using a public key of a central authority and a user identity as input.

6. The system of claim 4, wherein the second database user identifier is generated using a pseudo random function using as input a user identity and the second database identifier.

7. A non-transitory, computer readable storage medium having instructions stored thereon that, when executed by a computer, implement a method for managing unlinkable database user identifiers, the method comprising:

distributing, by a central authority having a computer processor, to a first database ran on a first server a first encrypted user identifier, a first database identifier, and a first database user identifier, wherein the first encrypted user identifier is generated using an encryption function using a public key of the central authority and a user identity as input and wherein the first database user identifier is generated using a pseudo random function using as input a user identity and the first database identifier;

distributing, by the central authority to a second database ran on a second server a second encrypted user identifier, a second database identifier, and a second database user identifier;

receiving from the first database a third encryption and a fourth encryption, the third encryption being formed from the first encrypted user identifier, the second database identifier, and a message comprised in the fourth encryption;

decrypting the third encryption thereby obtaining a decrypted value;

decrypting the fourth encryption thereby obtaining a decrypted fourth encryption;

deriving a blinded user identifier from the decrypted value; and encrypting the blinded user identifier and sending the encrypted blinded user identifier and the decrypted fourth encryption to the second server thereby enabling the second server to compute the second database user identifier from the encrypted blinded user identifier and the decrypted fourth encryption, wherein the first encrypted user identifier, the second encrypted user identifier, the first database user identifier and the second database user identifier are deleted after the distribution to the first database and the distribution to the second database, respectively, to provide secure cross-server data access to private data of individuals and to prevent cross-identification of personal data across the servers.

\* \* \* \* \*